UNITED STATES PATENT OFFICE.

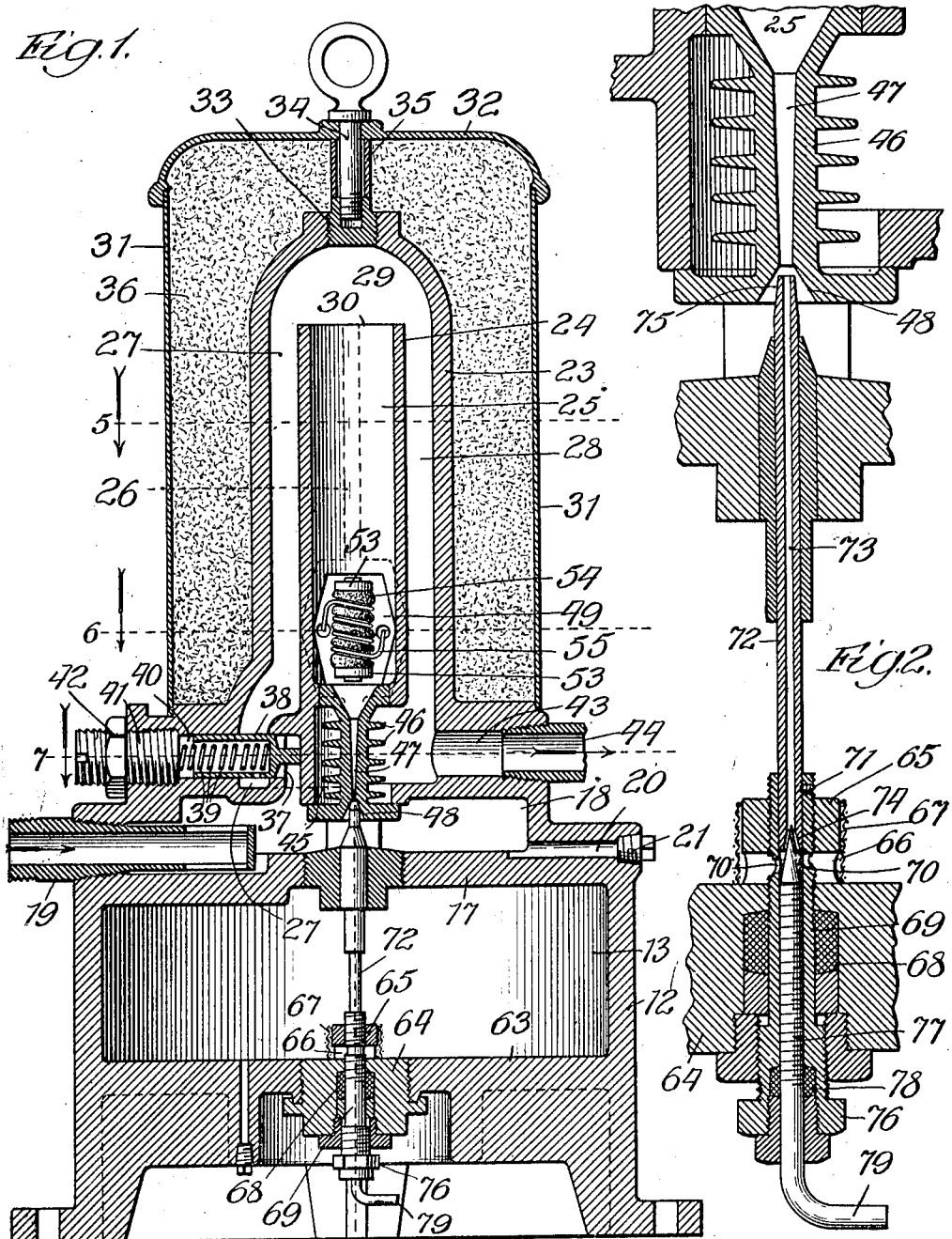

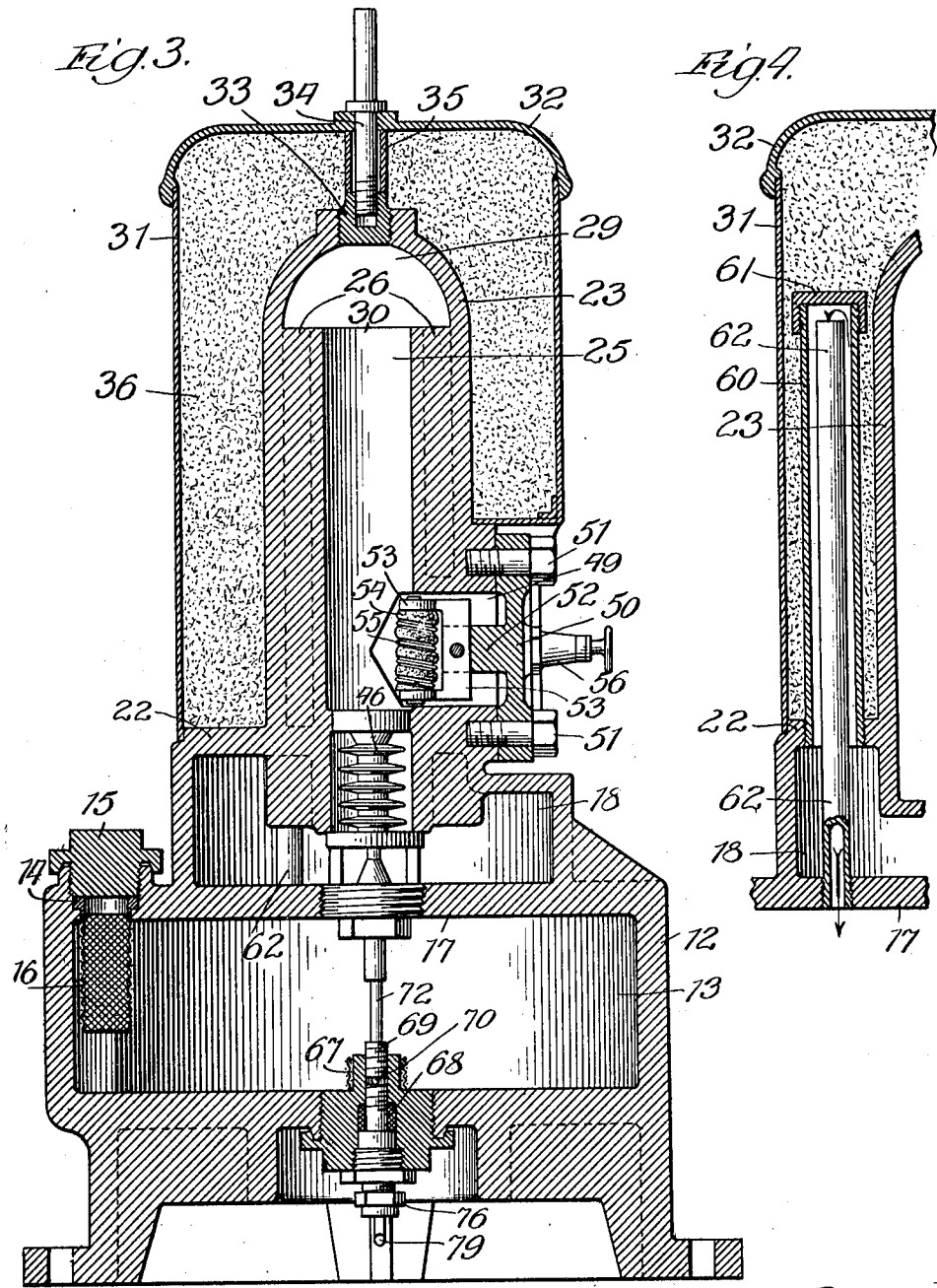

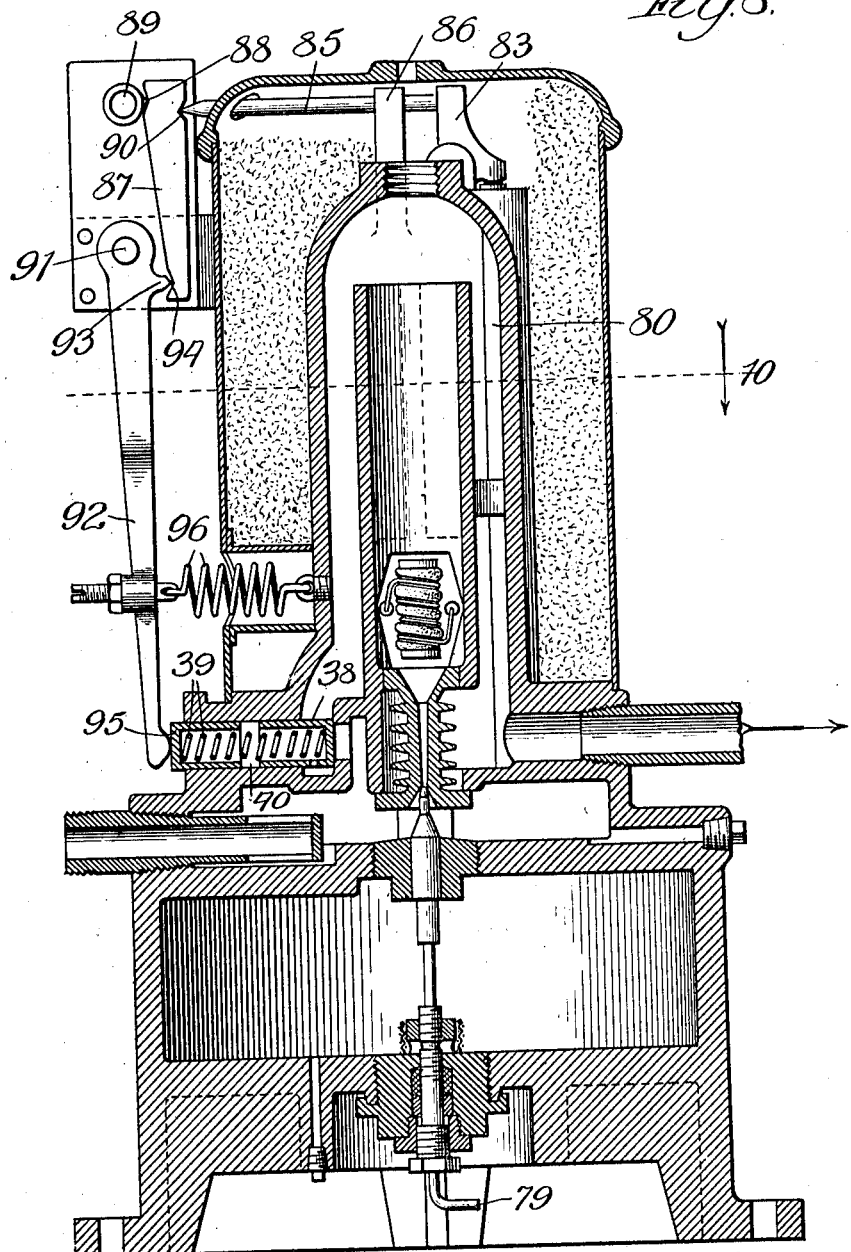

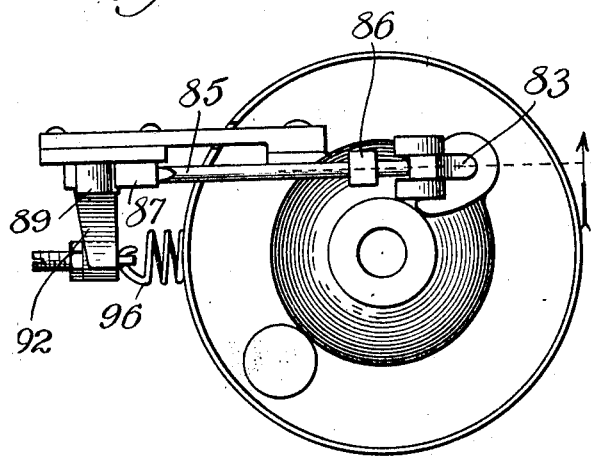
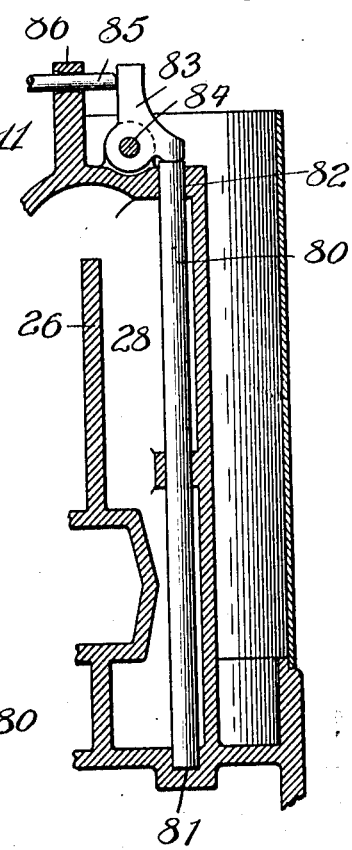
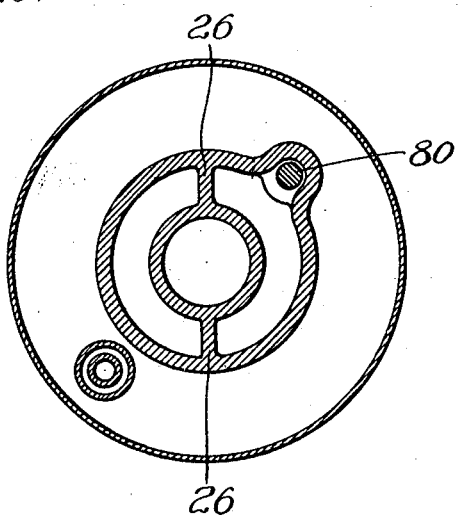

MORRIS C. WHITE AND OTHO C. DURYEA, OF CHICAGO, ILLINOIS, ASSIGNORS TO THE STERLING DEVELOPMENT COMPANY, OF CHICAGO, ILLINOIS, A CORPORATION OF SOUTH DAKOTA.

HEATER FOR MOTOR FLUIDS 1,020,067.  Specification of Letters Patent.  Patented Mar. 12, 1912.

Application filed February 15, 1911. Serial No. 608,849.

*To all whom it may concern:*

Be it known that we, MORRIS C. WHITE and OTHO C. DURYEA, citizens of the United States, residing at Chicago, in the county of Cook and State of Illinois, have invented a new and useful Improvement in Heaters for Motor Fluids, of which the following is a specification.

This invention relates to an improvement in the construction of motor-fluid heating devices, and more especially to a device of this class adapted to be interposed in a compressed-air conducting pipe for the purpose of heating the compressed air to increase its efficiency as a motor-fluid and to decrease its temperature-reducing influence when expanding.

Our object is to provide a heater for the purpose stated of a simple and improved construction which will render it particularly efficient and desirable as an adjunct applicable, more especially, to the compressed air pipe-lines of pneumatic engines and tools.

Figure 5:
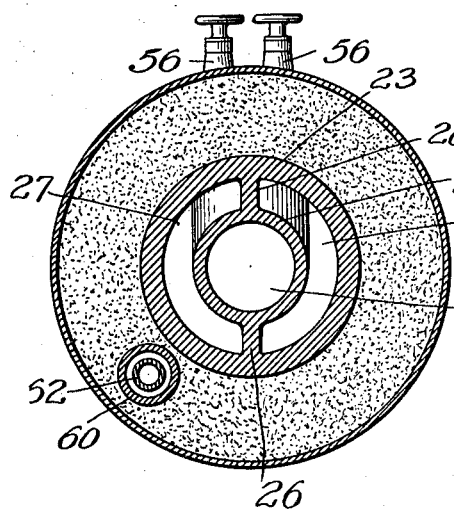
Figure 6:
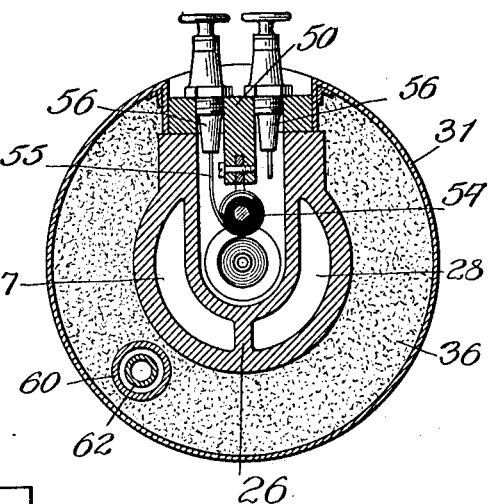
Figure 7:
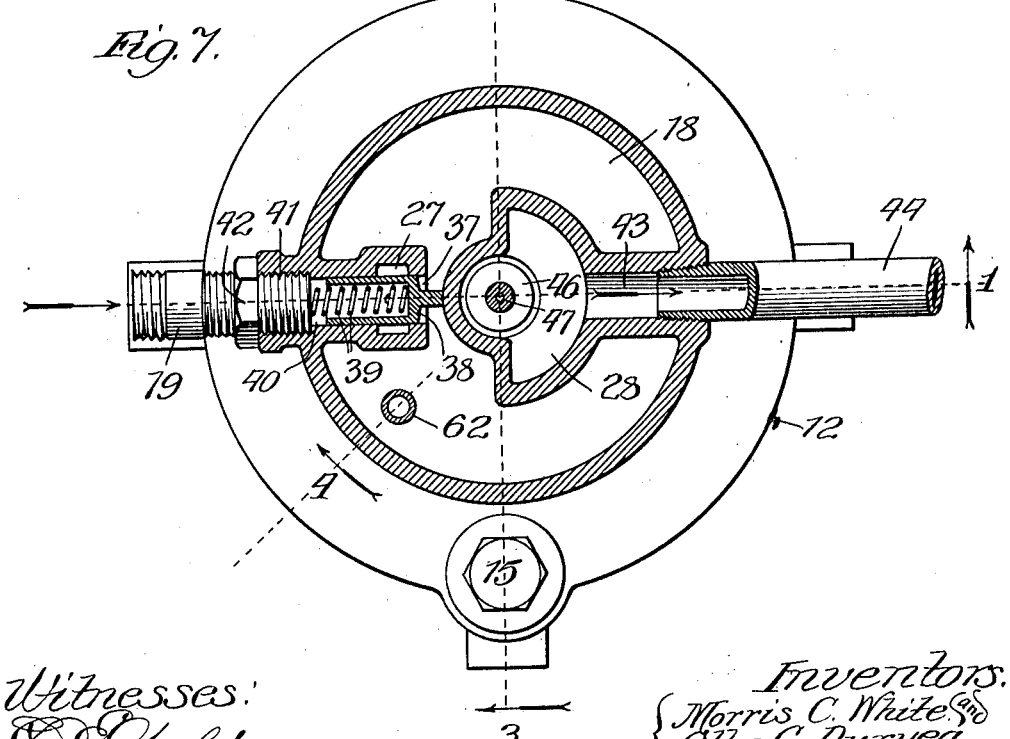

Referring to the drawings—Figure 1 is a vertical section of our improved heater, taken on line 1 in Fig. 7; Fig. 2, an enlarged section taken on line 2 in Fig. 1; Fig. 3, a vertical section of the heater taken on line 3 in Fig. 7; Fig. 4, a broken section taken on line 4 in Fig. 7; Figs. 5, 6 and 7 plan sections taken, respectively, on lines 5, 6 and 7 in Fig. 1; Fig. 8, a vertical section of the heater equipped with thermostatic valve-controlling mechanism; Fig. 9, a top plan view of the construction shown in Fig. 8; Fig. 10, a plan section taken on line 10 in Fig. 8; and Fig. 11, a broken section taken on line 11 in Fig. 9, and viewed in the direction of the arrow.

The device is adapted to be interposed in a pipe-line between a compressor or compressed-air supplier and a pneumatic tool, engine or other power-translating device.

It comprises, generally stated, a receptacle for gasolene, kerosene, or the like volatile hydrocarbon, and regulable means for feeding the hydrocarbon to a combustion-chamber, where it is ignited to heat the compressed air traversing the pipe-line.

The reference numeral 12 designates a base containing a receptacle 13, or the like, having a filling-opening 14 closed by a screw-plug 15 and having a strainer 16. Integral with the top-wall 17 of the chamber 13 is a chamber 18 in open communication at one side with the air-inlet pipe 19 from the compressed-air supplier. Communicating with the chamber 18 is a drain-port 20 closed by a screw-plug 21. Integral with the top-wall 22 of the chamber 18 is a dome-shaped projection or structure 23 containing a central tube 24 inclosing the combustion-chamber 25. At opposite sides of the tubular part 24 are webs or partitions 26 which separate the space between the walls 23, 24 into the inlet-passage 27 and outlet-passage 28 communicating with the chamber 29 above the open end 30 of the combustion-chamber 25. Surrounding the structure 23 and fitting at its lower end against the wall 22 is a cylindrical shell 31 closed at its top by a cap 32. In the top of the chamber 29 is an opening closed by a screw-plug 33 and the cap 32 is held in place by an eye-bolt 34 extending through the cap 32 and threaded into the plug 33, as shown. Surrounding the eye-bolt is a sleeve 35 forming a spacer between the cap 32 and plug 33. The chamber 36 about the structure 23 inclosed by the shell 31 and cap 32 may, in practice, be filled with asbestos, or the like heat-insulating material. Communication between the chamber 18 and passage 27 is through a port 37 normally closed by a cylindrical plunger or check-valve 38 which is pressed to its seat by a spring 39. The outer end of the bore 40 in which the valve 38 works is closed by a tensioning-screw 41 for the spring 39 carrying a lock-nut 42. Extending from the lower end of the passage 28 is an outlet-port 43 to the pipe 44 of the pipe-line. Between the base of the combustion-chamber 25 and the chamber 18 is a space 45 in open communication with the passage 28, and crossing the said space is a circumferentially-ribbed pipe 46 having an upwardly-tapering bore or passage 47 affording communication between the chambers 18 and 25. The lower end of the bore 47 presents a downwardly-flaring mouth 48. In one side of the structure and extending to the chamber 25 is an opening or chamber 49.

The reference numeral 50 designates the base-plate of an electric igniter fitting against the structure 23 and secured in place by bolts 51 to close the chamber 49. Integral with the base-plate 50 is a lug 52 to which is secured a frame 53 carrying a cylinder or spool 54 of highly refractory heat-conducting and electric-resistance material. The spool 54 has a winding 55 of resistance wire which extends to binding-posts 56 on the base-plate or cap-piece 50. The binding-posts are in circuit with an electric battery or generator the current from which operates to maintain the resistance winding or coil 55 incandescent.

Rising from the top-wall 22 of the chamber 18, in the space 36, is a tube 60 closed at the top by a cap 61 and opening at its lower end into the chamber 18. Within the tube 60 is a tube 62 tapped at its lower end through the top-wall 17 of the chamber 13 and opening at its upper end into the top of the tube 60.

In the center of the base-wall 63 of the chamber 13 is a threaded opening closed by a screw-plug 64 having a central boss 65. The boss has a central threaded bore to which extend openings 66 from the chamber 13, the boss being surrounded by a strainer 67. Extending through a stuffing-box 68 in the plug 64 is a tube 69 threaded at its upper end to work through the threaded opening in the boss 65 and having inlet-openings 70 in its sides. Extending downward into the top of the bore of the tube 69 and fastened thereto, as by means of the set-screw 71, is a tubular extension 72 containing a small gasolene-passage 73 flared at its lower end to form a needle-valve seat 74. The tube 72 has a tapering upper end 75 restricting the flaring port 48 of the passage 47. The tube-extension 72 may be positioned at its top with reference to the port 48 by turning it on its axis by means of a tool applied to the lower headed end 76 of the tube 69. Beneath the openings 70 the interior of the tube 69 is threaded to receive a threaded needle-valve 77 working through a stuffing-box 78. The needle-valve coöperates with the valve-seat 74 and has a handle 79 at its lower end.

In operation compressed-air entering through the air-inlet 19 fills the chamber 18 and opening the valve 38 moves through the passage 27, 29, 28 to the air-outlet 43. The top of the tube-extension 72 is adjusted with reference to the flaring port 48 of the passage 47, so that a limited amount of air will pass from the chamber 18 upward into the passage 47. The needle-valve 77 is opened, more or less, to admit the gasolene, or the like, from the chamber 13 into the tube 72. The current of air passing upward around the top of the tube 72 into the passage 47 operates to suck gasolene through the bore 73 of the tube and spray it upward through the passage 47 into the chamber 25. Air passing from the chamber 18 through the tube 60 and downward through the tube 62 enters the gasolene receptacle 13 to maintain the pressure therein the same as that in the chamber 18.

The electric current is turned into the resistance wire 55 to heat the same to incandescence, so that, as the gasolene vapor is atomized and sprayed upward by the air-current through the bore 47, it is ignited by the incandescent wire. The combustion of the burning-mixture thus brought about in the chamber 25 heats the structure and the air passing through the passages 27, 29, 28. The ribbed pipe containing the passage 47 is heated, so that the mixture entering through the port 48 is quickly gasified before reaching the igniter. The products of combustion from the chamber 25 enter the air current through the passages 27, 29, 28.

It is very desirable in practice that the temperature of the air in the pipe-line shall be under control, so as to be neither too low nor too high. In the present device the temperature is controlled by the extent of consumption of burning fluid. The heat-regulating adjustment is effected by the tensioning of the spring 39 which governs the back-pressure of the valve 38, and this tensioning is effected by turning the tensioning screw 42. If, for example, greater heat is desired, the spring 39 is tensioned to raise the resistance of the valve 38 against opening. The effect of this is to increase the volume and force of the air-current passing through the port 48, thereby increasing the amount of burning-mixture discharged into the combustion-chamber. If a lower temperature is desired, the tensioning-screw 42 may be turned to relieve the tension of the spring 39 and thus weaken the resistance of the valve 38, so that the pipe-line air will pass more readily through the main-passage 27, 29, 28 and with correspondingly decreased force and volume through the by-passage formed by the bore 47 and combustion-chamber 25. This manner of regulating the combustion of burning mixture is very effective in practice and forms a most desirable means for regulating the temperature of the pipe-line air passing from the device. The proportions of gasolene and air in the mixture are regulated by the needle-valve 77 and the positioning of the top of the tube 72 with reference to the port 48. It will be seen that when no air is traversing the pipe-line there will be no feed of burning-mixture to the combustion-chambers; and that combustion starts automatically when air starts to flow through the pipe-line, and stops with the stoppage of said flow.

The construction described necessitates hand-regulation of the tension of the spring 39 for the purpose set forth. In the construction shown in Figs. 8 to 11, inclusive, we provide thermostatic regulation of the tension of the spring 39 for the said purpose. Mounted in the passage 28 is a vertical rod 80, of copper or other suitable metal, resting at its lower end on a fixed bearing 81 and passing at its upper end through an opening 82 in the structure. The rod 80 at its upper end bears against the short arm of a bell-crank lever 83, pivoted at 84, and the long arm of the bell-crank lever bears against a plunger-rod 85 sliding in a guide 86 on the structure. A lever 87 is engaged at a socket 88 near its upper end at one side by a knife-blade bearing 89 and is engaged at a notch 90 in its opposite side by the end of the rod 85. Pivoted at 91 is a lever 92 having a knife-blade bearing 93 engaging a notch 94 in the lower-end portion of the lever 87. At its lower end the lever 92 contacts with the outer end of a sliding tensioning cup 95, for the spring 39, working in the bore 40. Between its ends the lever 92 is engaged by a spring 96, of materially greater resistance than the spring 39 equipped with tensioning means 97. The construction is such that the spring 96 presses the lower end of the lever 92 against the cup 95 to increase the tension of the spring 39, and at the same time presses the short arm of the bell-crank lever 83 against the top of the rod 80, through the compound lever-mechanism described. When the heating-device is first started into operation the resistance against opening of the valve 38 is so great that a current of air of maximum force and volume will be directed through the port 48 carrying with it a proportionate amount of gasolene and producing, as it burns, rapid heating of the structure and main air-current. As the temperature of the air in the outlet-passage 28 increases it expands the thermostatic rod 80, causing it, through the compound lever mechanism described, to swing the lever 92 against the resistance of the spring 96 in the direction of relieving its pressure against the cup 95, thereby relaxing the tension of the spring 39 and permitting the air to pass more readily through the direct passage 27, 29, 28. The consequence of this is to reduce the force and volume of the air-current passing into the combustion-chamber 25 through the port 48 and therefore the amount of burning mixture which is consumed. The parts are in practice so adjusted and arranged that the thermostatic mechanism will properly control the temperature of the air passing through the device into the pipe-line.

In the case of a pneumatic pipe-line for operating engines, drills, riveters and other tools, the volume of air passing through the pipe-line varies frequently according to the escape of air at the tool or engine. One of the advantages of our improvement lies in the fact that when the engine or tool is not operating, and there is no current of air through the pipe-line, there is no feed of fuel to, and consequently no heat generated in, the combustion chamber to unduly heat the device. Another advantage lies in the fact that the gasolene, or the like, is fed from beneath the burner by the suction-action of the by-passage air-current, instead of by gravity or pressure, all of which contributes not only to the readiness with which the temperature may be controlled, as described, but also to the safety of the device.

While we prefer to construct our improved heater as shown and described, it may be variously modified in the matter of details of construction without departing from the spirit of our invention as defined by the claims.

What we claim as new and desire to secure by Letters Patent is—

1. The combination with a pneumatic pipe line, of a heating chamber connected to said pipe line, a fluid-fuel burner located in said chamber, means whereby the closing of the pipe line beyond the heater will stop the feed of fuel to the burner, an igniter located in the chamber, and means independent of the burner for maintaining said igniter at a fuel igniting temperature.

2. The combination with a pneumatic pipe line, of a heating device interposed in said line, having a main-passage and a by-passage for the air traversing the pipe line, a combustion-chamber interposed in the by-passage and discharging into the main passage, a fluid fuel supplier in the path of and actuated by the by-passage-air flowing to said chamber, an igniter located in the chamber, means whereby the closing of the pipe line beyond the heater will stop the feed of fuel to the chamber, and means independent of the heat of combustion in the chamber for maintaining said igniter at a constant fuel igniting temperature to ignite the fuel as it passes into said chamber.

3. The combination with a pneumatic pipe line, of a heater interposed in the pipe line having a main pipe line passage and a by-passage for air communicating therewith, a combustion-chamber interposed in the by-passage, means for directing fluid-fuel into said chamber, means whereby the closing of the pipe line beyond the heater will stop the feed of fuel into the combustion chamber, an igniter located in the chamber, and means independent of the heat of combustion in the chamber for maintaining said igniter at a fuel igniting temperature.

4. The combination with a pneumatic pipe line, of a heater interposed in the pipe line having a main pipe line passage and a by-passage for air communicating therewith, a combustion-chamber interposed in the by-passage, means for varying the flow through the by-passage with reference to the flow through the main passage, means for directing fluid-fuel into said combustion chamber, an igniter located in the chamber, and means independent of the heat of combustion in the chamber for maintaining said igniter at a fuel igniting temperature.

5. The combination with a pneumatic pipe line, of a heater for the air traversing said line, having a main pipe line passage and a by-passage for air communicating therewith, a combustion chamber interposed in the by-passage, means for mixing fluid-fuel with the air passing into said chamber, means for varying the flow through the by-passage with reference to that through the main passage, an igniter located in the chamber, and means independent of the heat of combustion in the chamber for maintaining said igniter at a fuel igniting temperature.

6. The combination with a pneumatic pipe line, of a heater for the air traversing said line, having a main pipe line passage and a by-passage for air communicating therewith, an air heating chamber interposed in the by-passage, means adjustable from the outside of the heater for varying the flow through the by-passage with reference to the flow through the main passage, means for mixing fluid-fuel with the air passing into said chamber, means whereby the closing of the pipe line beyond the heater will stop the flow of fuel into the chamber, an igniter located in the chamber, and means independent of the heat of combustion in the chamber for maintaining said igniter at a fuel igniting temperature.

7. The combination with a pneumatic pipe line, of a heater, for the air traversing said line, having an inlet from and an outlet to the pipe line, a main air passage and a by-passage between said inlet and outlet, a combustion-chamber interposed in the by-passage, a valve in the main passage operating to resist the force of flow therethrough and thus increase the relative force of the flow through the by-passage, means for mixing fluid-fuel with the air passing into said chamber, means whereby the closing of the pipe line beyond the heater will stop the flow of air into the chamber, an igniter located in the chamber, and means independent of the heat of combustion in the chamber for maintaining said igniter at a fuel igniting temperature.

8. The combination with a pneumatic pipe line, of a heater, for the air traversing said line, having a pipe line passage through it, a combustion-chamber interposed in the passage, a liquid-fuel receptacle, at a lower level than said chamber, provided with an outlet tube having its discharge opening in said passage to be swept by the air passing into said chamber, whereby a combustible mixture is formed, an igniter located in the chamber and means independent of the heat of combustion in the chamber for maintaining said igniter at a fuel igniting temperature.

MORRIS C. WHITE.
OTHO C. DURYEA.

In presence of—
 PAULINE BEEKMAN,
 R. A. RAYMOND.